(12) United States Patent
Jeong et al.

(10) Patent No.: US 10,243,411 B2
(45) Date of Patent: Mar. 26, 2019

(54) WIRELESS CHARGER WITH UNIFORM H-FIELD GENERATOR AND EMI REDUCTION

(71) Applicant: QUALCOMM Incorporated, San Diego, CA (US)

(72) Inventors: Seong Heon Jeong, San Diego, CA (US); Jeong Il Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 784 days.

(21) Appl. No.: 14/490,067

(22) Filed: Sep. 18, 2014

(65) Prior Publication Data
US 2016/0087477 A1    Mar. 24, 2016

(51) Int. Cl.
*H02J 50/23* (2016.01)

(52) U.S. Cl.
CPC .................... *H02J 50/23* (2016.02)

(58) Field of Classification Search
CPC . Y02E 60/12; H02J 7/025; H02J 50/23; H02J 5/005; H02J 17/00; H01F 38/14; H01F 38/18; H01F 21/06; H01F 27/325; H01F 29/12; H01F 29/10; Y02T 90/122; B60L 11/182; G01D 5/2066; G01D 5/204; A41D 1/002; B60R 16/027; G06F 1/163; G01R 33/02
USPC .......... 320/108; 307/104; 336/115, 118, 130
See application file for complete search history.

(56) References Cited

U.S. PATENT DOCUMENTS

| | | | |
|---|---|---|---|
| 5,304,767 A * | 4/1994 | McGaffigan | H05B 6/065 219/674 |
| 5,923,544 A | 7/1999 | Urano | |
| 6,366,817 B1 | 4/2002 | Kung | |
| 6,906,495 B2 | 6/2005 | Cheng et al. | |
| 2007/0145830 A1* | 6/2007 | Lee | H02J 5/005 307/135 |
| 2010/0259215 A1* | 10/2010 | Sip | H02J 7/025 320/108 |
| 2010/0259217 A1* | 10/2010 | Baarman | H02J 5/005 320/108 |
| 2011/0074349 A1 | 3/2011 | Ghovanloo | |
| 2011/0306296 A1* | 12/2011 | Takahashi | G06K 7/10336 455/41.1 |
| 2012/0007437 A1 | 1/2012 | Fells et al. | |
| 2013/0119926 A1* | 5/2013 | Lin | H02J 7/025 320/108 |
| 2013/0120096 A1* | 5/2013 | Liang | H02K 3/26 336/200 |

(Continued)

*Primary Examiner* — Richard Isla
*Assistant Examiner* — Mohammed J Sharief
(74) *Attorney, Agent, or Firm* — Hunter Clark PLLC

(57) ABSTRACT

The present disclosure pertains to wireless chargers. In one embodiment, a 2×2 array of conductive coils produces magnetic fields. Adjacent coils receive current having different directions to cancel magnetic fields around a periphery of the array. A wireless charging platform may include at least four such coils. Regions between and above the coils may include magnetic fields approximately parallel to the surface of the platform so that electronic devices may be charged while standing up during operation by a user with reduced exposure to magnetic radiation. An electronic device may also be placed flat on each coil for charging.

18 Claims, 8 Drawing Sheets

(56) References Cited

U.S. PATENT DOCUMENTS

| | | | |
|---|---|---|---|
| 2013/0141203 A1* | 6/2013 | Yoon | H01L 23/5227 336/170 |
| 2014/0028111 A1* | 1/2014 | Hansen | H01F 38/14 307/104 |
| 2014/0176055 A1* | 6/2014 | van Lammeren | H04B 5/0037 320/108 |
| 2014/0184151 A1* | 7/2014 | Han | H01F 5/04 320/108 |
| 2015/0155737 A1* | 6/2015 | Mayo | H02J 7/025 320/108 |

* cited by examiner

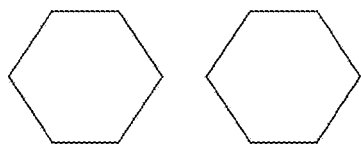
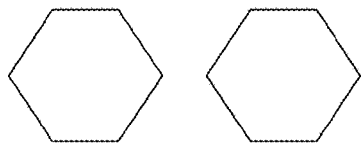
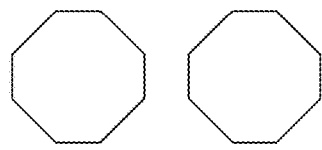
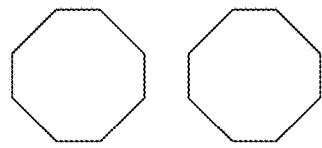
Fig. 8A
Fig. 8B
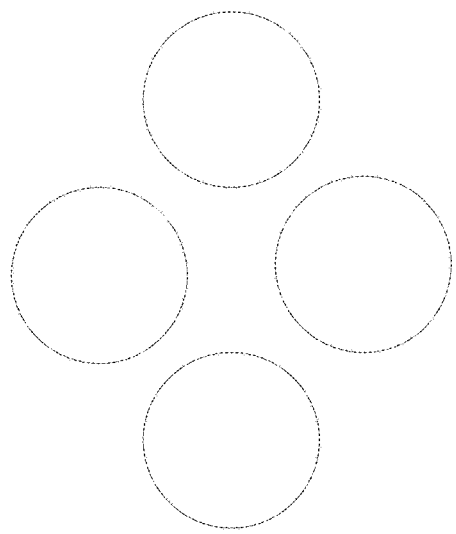
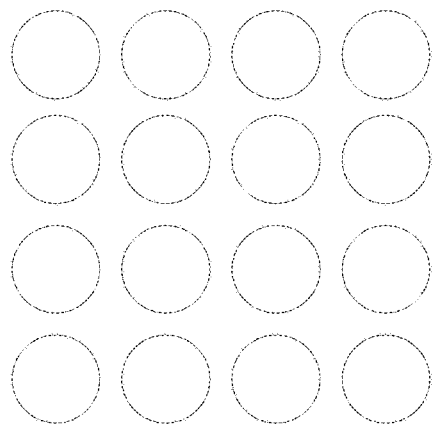
Fig. 9A
Fig. 9B

WIRELESS CHARGER WITH UNIFORM H-FIELD GENERATOR AND EMI REDUCTION

FIELD

The present disclosure relates to wireless charging, and in particular, to wireless charging with uniform magnetic field generators.

BACKGROUND

The proliferation of battery operated electronic systems, such as smartphones, tablets, or even electric cars, has put increasing demands on charging systems used to transfer power to these systems. For example, mobile devices typically store power in a battery. As the device is used, the energy in the battery is depleted and the battery must be recharged. Typically, mobile devices are connected through a power cable to a wall outlet to receive voltage and current for recharging the battery.

Recently, attempts have been made to provide power to battery operated systems wirelessly so that cumbersome wires and cables are not required for recharging the battery. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

The present disclosure includes wireless chargers with uniform magnetic field generators. In one aspect, the present disclosure includes a wireless charger comprising at least four conductive coils arranged in a two-by-two array, where each conductive coil in the two-by-two array is arranged to have a first adjacent conductive coil and a second adjacent conductive coil. When a particular conductive coil comprises a first current in a first direction around the particular conductive coil, a second current in the first adjacent conductive coil is in an opposite direction than the first direction around the first adjacent conductive coil and a third current in the second adjacent conductive coil is in the opposite direction than the first direction around the second adjacent conductive coil.

In one example, the at least four conductive coils are arranged on a wireless charging platform.

In one example, regions between and above the adjacent conductive coils comprise magnetic fields approximately parallel to a plane of the charging platform for simultaneous operation and charging of an electronic device when said electronic device is placed at a first angle to a plane of the wireless charging platform in one of the regions.

In one example, the first current and the second current flow in the same direction along a portion of the particular conductive coil that is adjacent to the first adjacent conductive coil and the first current and the third current flow in the same direction along a portion of the particular conductive coil that is adjacent to the second adjacent conductive coil.

In one example, the at least four conductive coils each comprise a plurality of loops.

In one example, the first current, the second current, and the third current are AC currents and the first current is 180 degrees out of phase with the second current and third current.

In one example, the at least four conductive coils are formed using a single conductor.

In one example, the at least four conductive coils comprising a first outer loop and a first inner loop, a first portion of the first outer loop comprising a first terminal, the first inner loop comprising a first crosspoint, a second outer loop and a second inner loop non-adjacent to the first outer loop and the first inner loop, the second outer loop coupled to the first crosspoint of the first inner loop, the second inner loop comprising a second crosspoint, a third outer loop and a third inner loop, the third outer loop coupled to the second crosspoint of the second inner loop, the third inner loop comprising a third crosspoint, and a fourth outer loop and a fourth inner loop, the fourth outer loop coupled to the third crosspoint, the fourth inner loop comprising a fourth crosspoint, wherein a second portion of the first outer loop is coupled to the fourth crosspoint and the second portion of the first outer loop comprises a second terminal, and wherein current flows between the first terminal and the second terminal.

In one example, the at least four conductive coils are formed on the same substrate.

In one example, the at least four conductive coils are a number of coils equal to a power of four.

In one example, the conductive coils comprise a single winding.

In one example, the conductive coils comprise a plurality of windings.

In one example, the conductive coils comprise a symmetric geometric shape.

In one example, the geometric shape is at least one of square, circular, hexagonal, or octagonal, or any combination thereof.

In one example, at least four conductive coils are arranged in the same plane.

In another aspect the present disclosure includes a method comprising receiving a first current in a first conductive coil to produce a first magnetic field, receiving a second current in a second conductive coil to produce a second magnetic field, receiving a third current in a third conductive coil to produce a third magnetic field, and receiving a fourth current in a fourth conductive coil to produce a fourth magnetic field. The first conductive coil, the second conductive coil, the third conductive coil, and the fourth conductive coil are arranged in a two-by-two array. The first conductive coil is arranged adjacent to the second conductive coil and the third conductive coil, and the fourth conductive coil is arranged adjacent to the second conductive coil and the third conductive coil. The first current and the fourth current are in a different direction than the second current and the third current.

In another aspect, the present disclosure includes a wireless charger comprising first means for producing a first magnetic field based on a first current, second means for producing a second magnetic field based on a second current, third means for producing a third magnetic field based on a third current, and fourth means for producing a fourth magnetic field based on a fourth current. In one example, the first means, second means, third means, and fourth means are conductive coils as described herein. The first means, the second means, the third means, and the fourth means are arranged in a two-by-two array, and wherein the first means is arranged adjacent to the second means and the third means, and wherein the fourth means is arranged adjacent to the second means and the third means, and wherein the first current and the fourth current are in a different direction than the second current and the third current.

The following detailed description and accompanying drawings provide a better understanding of the nature and advantages of the present disclosure.

BRIEF DESCRIPTION OF THE DRAWINGS

FIGS. 8A-B illustrate example geometric shapes for coils.

FIGS. 9A-B illustrate example coil arrays according to different aspects.

DETAILED DESCRIPTION

The present disclosure pertains to wireless charging. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

Figure 1:
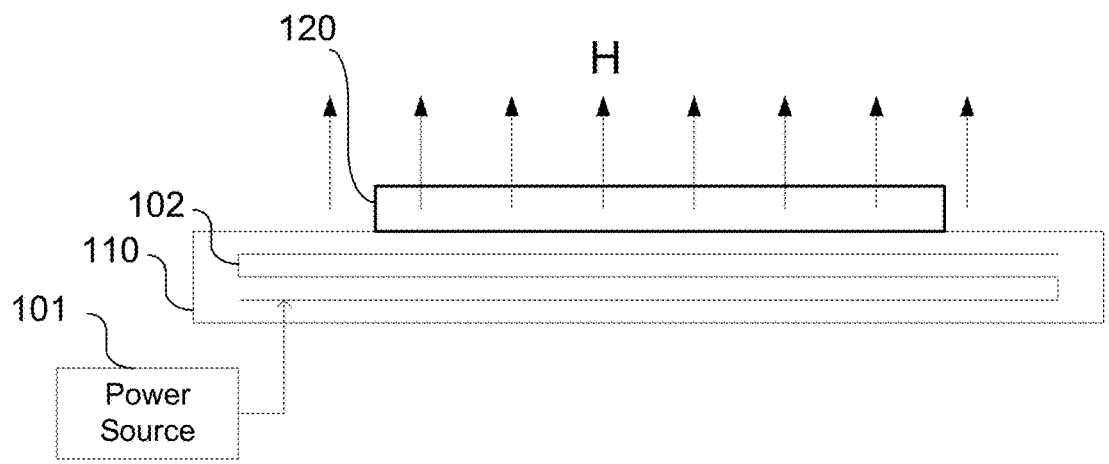
FIG. 1 illustrates a wireless charging scheme.

Wireless charging involves coupling energy from a power source to an electronic system using magnetic fields. The energy from the magnetic fields may be received by the system and used to charge a battery. Some systems may even use the received magnetic field energy to power electronics in the system when the device is being operated by a user, for example. FIG. 1 illustrates a wireless charging scheme. Here, a power source 101 provides electrical energy to an inductive coil 102 of a charging platform 110 (referred to as the power transmitting unit, "PTU"). Current through the inductive coil generates magnetic field, H, perpendicular to a plane of the coil. The energy in the magnetic field may be captured by another inductive coil (not shown) in a device 120 to be charged (referred to as the power receiving unit, "PRU"). The power receiving unit may use the received energy from the magnetic field to operate the device or charge a battery, for example.

Figure 2:
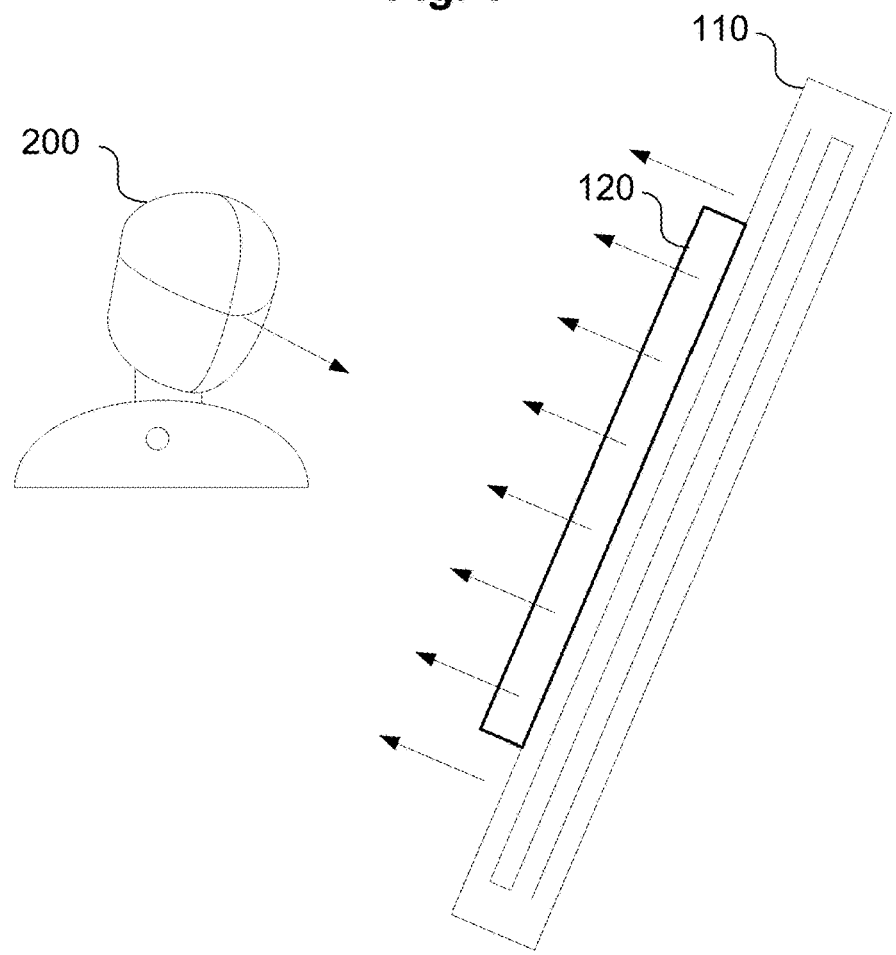
FIG. 2 illustrates a problem associated with a charging platform during wireless charging.

Charging may occur in some charging systems when the inductive coils in a PTU and PRU are well aligned, such as when a device is placed flat on the flat surface of a charging platform so that the coils overlap and are in the same plane. However, it is sometimes desirable to provide power to a device wirelessly while the device is in use. In this case, for example, a user may be facing directly into the magnetic fields emanating perpendicular to the plane of the charging platform. FIG. 2 illustrates a scenario where a user places the charging platform 110 and device 120 at an angle during wireless transfer of power to the device. As illustrated in FIG. 2, this arrangement may expose the user to undesirably strong magnetic fields emanating both within and around the PTU coil. RF exposure to users is problematic and should not exceed certain limits defined by the FCC (Federal Communication Committee), for example. In some cases, wireless power organizations may regulate maximum transmitting and receiving power level on PTU and PRU. Therefore, designing an inductor that can reduce unnecessary radiated emission is desirable for some applications.

Furthermore, in wireless power transfer, generating a uniform magnetic field (H-field) is important for successful implementation because interaction between the PTU and PRU is characterized by mutual inductance, which is heavily dependent on H-field distribution on both inductors. Uniform mutual inductance over a charging area results in higher efficiency and better performance in the PTU due to the small impedance variation at the output of the power source 101. Also, field uniformity allows the PRU to easily comply with multiple different PTUs. Therefore, a uniform H-field can be an important feature in designing PTU and PRU coils for some applications.

Figure 3:
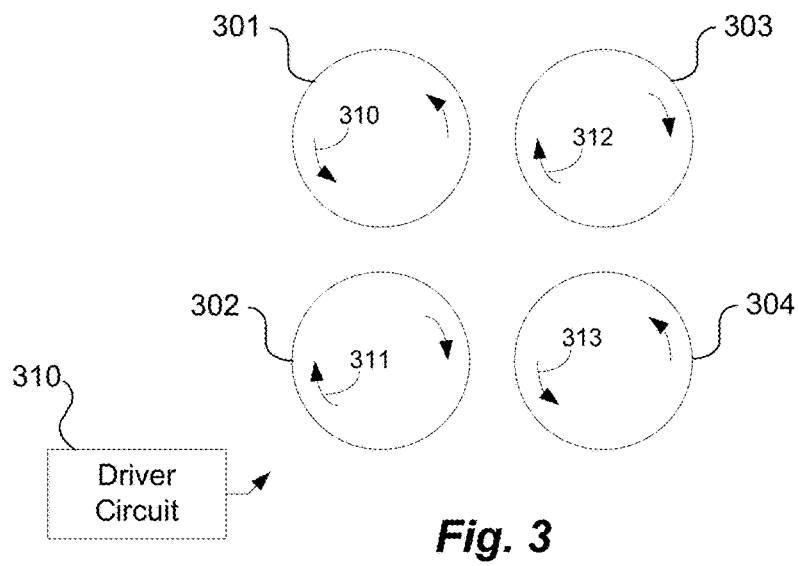
FIG. 3 illustrates a wireless charger according to one aspect of the disclosure.

FIG. 3 illustrates a wireless charger according to one aspect. Features and advantages of some aspects of the present disclosure include multiple conductive coils that produce uniform fields. In one aspect, a wireless charger may include four conductive coils arranged in a two-by-two (2×2) array as illustrated in FIG. 3. FIG. 3 shows conductive coils 301, 302, 303, and 304. Each conductive coil in the 2×2 array is arranged to have a first adjacent coil and a second adjacent coil. For example, conductive coil 301 may have a first adjacent coil 302 (or 303) and a second adjacent coil 303 (or 302). Similarly, conductive coils 301 and 304 are adjacent coils to conductive coil 303. Likewise, conductive coils 303 and 302 are adjacent coils to conductive coil 304. Finally, conductive coils 301 and 304 are adjacent coils to conductive coil 302.

Conductive coils 301-304 may comprise a single winding (or loop) or multiple windings of conductive materials to produce magnetic fields when a current is passed through the loop(s), for example. Each conductive coil 301-304 may be driven by a driver circuit 310. In some embodiments, drive circuit 310 may drive each conductive coil 301-304 individually (e.g., with separate power amplifiers), and in other embodiments drive circuit 310 may drive all conductive coils 301-304 together (e.g., with a single power amplifier).

As illustrated in FIG. 3, adjacent coils may have currents that move in opposite directions. For example, a particular conductive coil (e.g., coil 301) may comprise a first current 310 in a first direction (e.g., counterclockwise) around coil 301. A second current 312 in an adjacent conductive coil 303 is in an opposite direction (clockwise) than the first direction around coil 303 and a third current 311 in the coil 302 is in the opposite direction (clockwise) around the coil 302. When current is flowing in all coils, the above may be true across all coils in the 2×2 array. For example, conductive coil 304 may comprise a first current 313 in a first direction (e.g., counterclockwise) around coil 304. A second current 312 in an adjacent conductive coil 303 is in an opposite direction (clockwise) around coil 303 and a third current 311 in coil 302 is in the opposite direction (clockwise) around coil 302. Likewise, for coils 302 and 303, currents 311 and 312 are a first direction (e.g., clockwise) and currents 310 and 313 in adjacent conductive coils 301 and 304, respectively, are in an opposite direction (counterclockwise) around coils 301 and 304. In one embodiment, the currents are AC currents and the power transfer between the coils and a receiving system uses magnetic resonance, for example. An AC current in a particular coil may be 180 degrees out of phase from the AC currents in adjacent coils. As illustrated below, oppositely directed currents in adjacent coils advantageously cancels magnetic fields around a perimeter of the 2×2 coil array, for example, and reduces the exposure of a user to potentially harmful emissions.

Figure 4:
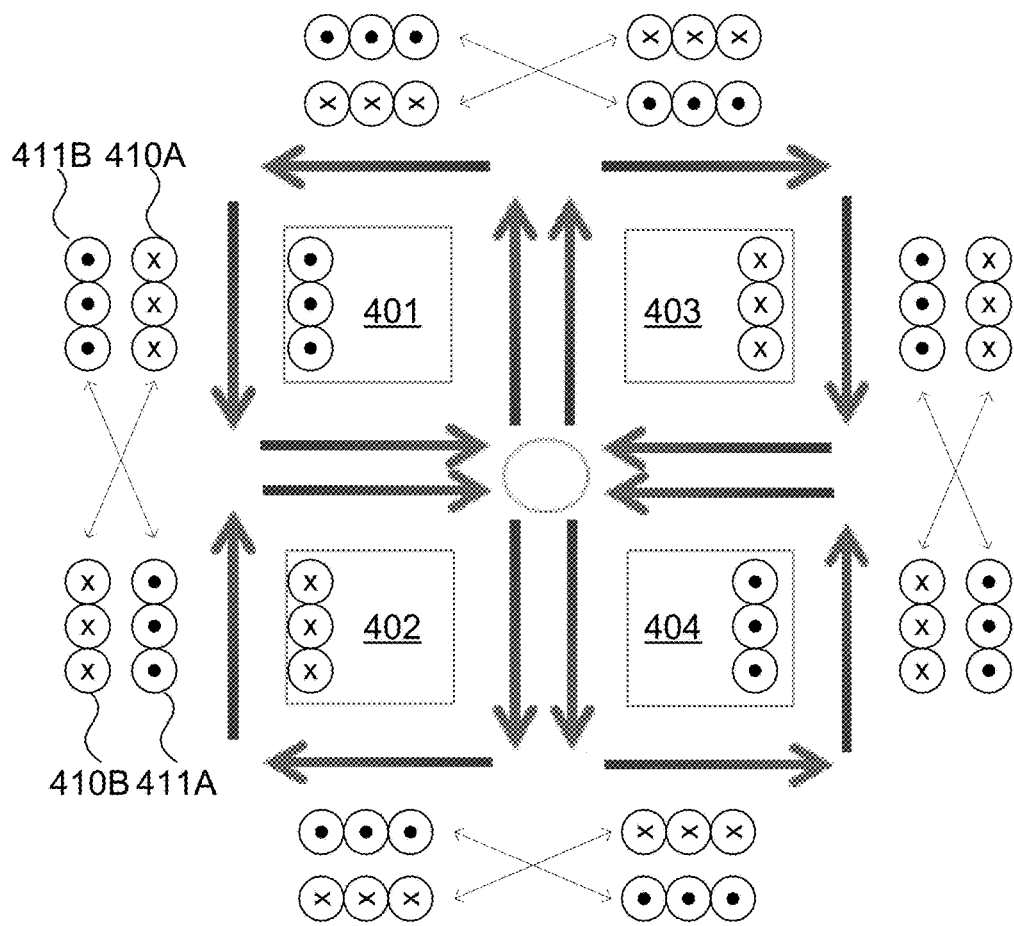
FIG. 4 illustrates a wireless charger with emission reduction.

FIG. 4 illustrates a wireless charger with emission reduction according to an embodiment. FIG. 4 shows an arrangement of four (4) H field generators (e.g., coils) 401-404 arranged in a 2×2 array. Current is passed through the coils so that current in adjacent coils are in opposite directions. Accordingly, oppositely directed currents produce opposite polarity fields. In FIG. 4, a circle with an interior dot denotes a magnetic field out of the page and a circle with an X denotes a field into the page. Coil 401 includes a counterclockwise current producing a field out of the page inside the coil and adjacent coils 402 and 403 have clockwise currents producing fields into the page inside the coils.

Oppositely directed currents in adjacent cells may result in two effects. First, the field from coil 401 forms a loop with fields from coils 402 and 403 to produce horizontal field components in the regions between the coils. Second, the fields advantageously cancel around the exterior of the 2×2 coil array. For example, coil 401 produces a field into the page at locations 410A and 410B. Conversely, coil 402 produces opposite fields out of the page at locations 411A and 411B. The fields from coils 401 and 402 act to cancel around the periphery of the array, thus reducing emissions. Similarly, oppositely directed currents in coils 401 and 403, coils 403 and 404, and coils 402 and 404 reduce the field strength outside the other peripheral portions of the 2×2 array. The unique arrangement of adjacently placed coils with opposite polarity currents also produces a more uniform H field across the coil array surface, including both perpendicular and parallel field components and reduced field emissions outside the periphery of the charging area. The above described conductive coils may provide the means for producing four magnetic fields based on a four currents in the different coils, for example.

Figure 5A:
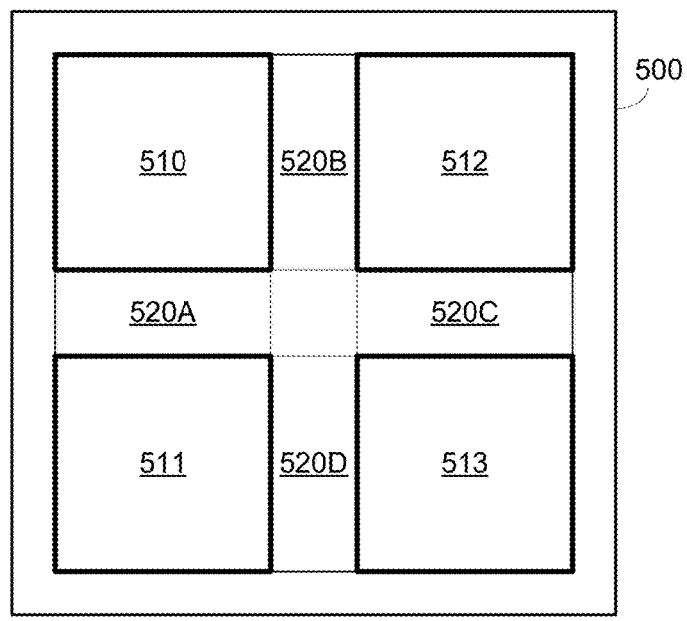
FIG. 5A illustrates a wireless charging platform.

FIG. 5A illustrates a wireless charging platform according to one embodiment. In some embodiments, one or more conductive coil arrays as described herein may be arranged on a wireless charging platform 500. Wireless charging platform 500 may include charging regions 510, 511, 512, and 513 for charging a device in a laying down position on a surface of the platform. Each charging region 510-513 may include a conductive coil as described above, for example. The charging regions 510-513 are separated by intermediate regions 520A-D between adjacent conductive coils. For example, a region 520A is between coils in charging regions 510 and 511, a region 520B is between coils in charging regions 510 and 512, a region 520C is between coils in charging regions 512 and 513, and a region 520D is between coils in charging regions 511 and 513. Conductive coils in regions 510-513 may be driven with current (e.g., AC or DC) to produce magnetic fields perpendicular to the plane of charging platform 500 and coils in regions 510-513 and approximately parallel to a plane of the charging platform (e.g., horizontal) over regions 520A-D.

Figure 5B:
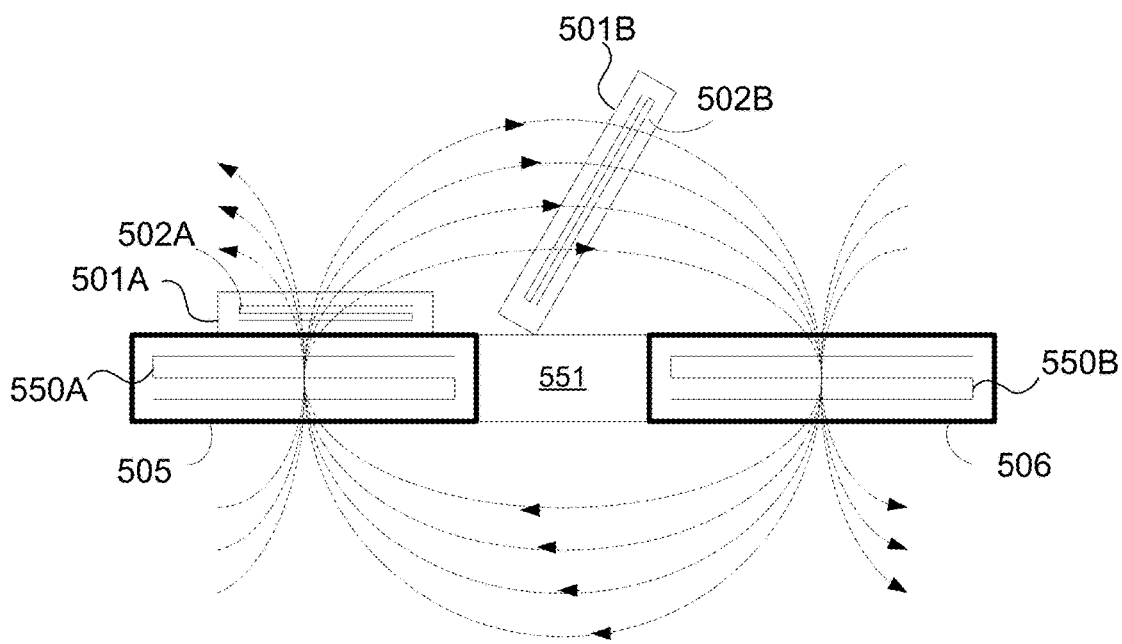
FIG. 5B illustrates horizontal and vertical charging on a wireless platform.

FIG. 5B illustrates horizontal and vertical charging on a wireless platform according to one embodiment. In this illustrative diagram, a charging platform includes a first charging region 505 including a conductive coil 550A and a second charging region 506 including conductive coil 550B. Current through conductive coils 550A and 550B are in opposite directions (e.g., 180 degrees out of phase) so that magnetic fields generated by the two coils are in opposite directions and form a loop as shown. Accordingly, a magnetic field is perpendicular to the plane of the charging platform over the surface of charging regions 505 and 506 and about parallel to the plane of the platform between and above adjacent conductive coils in a region 551, for example. Therefore, a device 501A having a coil 502A may be placed horizontal (laying down) in charging regions 505 and 506 to receive the magnetic field perpendicular to the plane, and a device 501B having a coil 502B may be placed at an angle (e.g., arranged vertically or standing up) in a region 551 between adjacent coils to receive the magnetic field parallel to the plane. Orthogonal (or nearly orthogonal) reception of magnetic fields by the coil in the electronic device results in efficient power transfer and charging. In region 551, parallel lines along the plane of the charging platform allow for simultaneous operation and charging of an electronic device when the electronic device is placed at a first angle to the plane of the wireless charging platform without exposing the user to direct magnetic radiation, for example.

Figure 6:
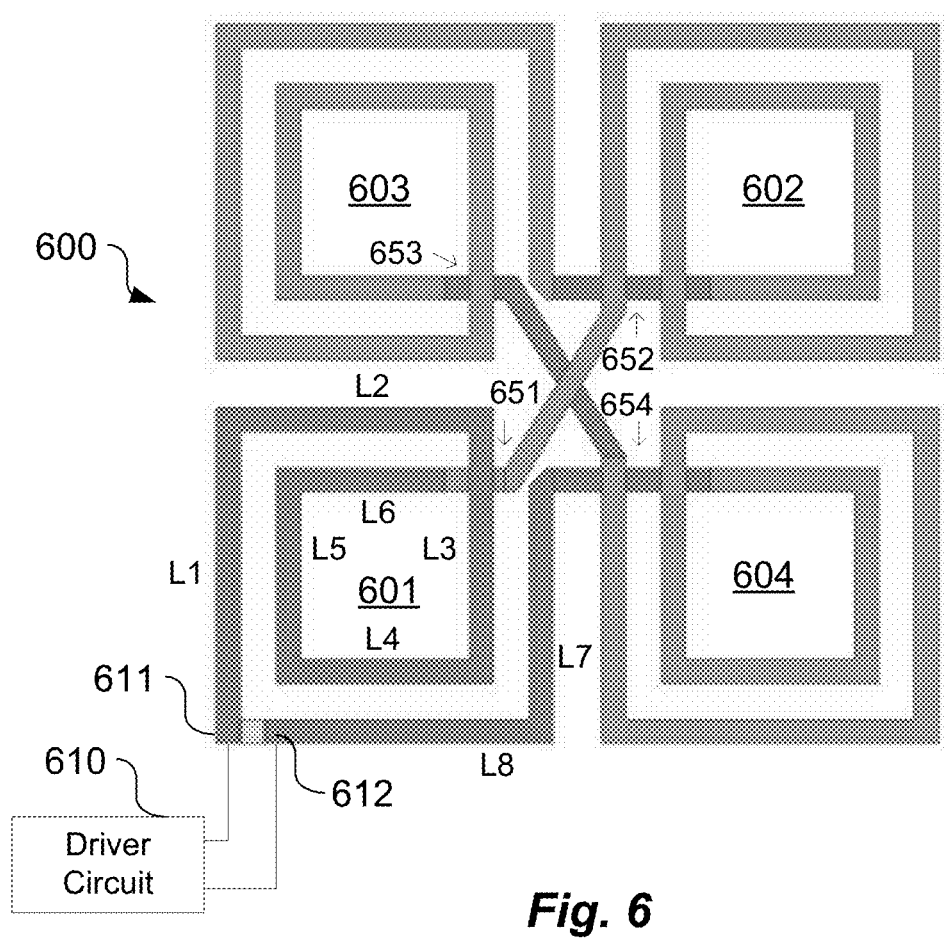
FIG. 6 illustrates an example 2×2 conductive coil.

FIG. 6 illustrates an example 2×2 conductive coil according to one embodiment. In this example, a driver circuit 610 may drive two terminals of a single conductor 600 configured to form four conductive coils 601, 602, 603, and 604. In this example, each conductive coil includes an inner winding and an outer winding. For example, coil 601 includes a first outer and first inner loop. A first portion of the first outer loop comprises a first terminal 611 coupled to one terminal of driver circuit 610. In this example, conductor 600 includes a first portion that extends along a first axis of a plane along a first length, L1, a second portion that turns at a right angle and extends along a second axis of the plane over a second length, L2, a third portion that turns at a right angle and extends along the first axis of the plane parallel to the first portion along a third length, L3, a fourth portion that turns at a right angle and extends along the second axis of the plane parallel to the second portion along a fourth length, L4, a fifth portion that turns at a right angle and extends along the first axis of the plane parallel to the first portion along a fifth length, L5, and a sixth portion that turns at a right angle and extends along the second axis of the plane parallel to the second portion along a sixth length, L6. Lengths L1-L6 and L7-L8 (described below) form outer and inner loops, which in this case are squares of successively decreasing area. Length L6 terminates in a first crosspoint 651. A crosspoint may go under or over one or more conductive traces, for example A second non-adjacent coil 602 similarly includes a second outer and second inner loop. The second outer loop is coupled to the first crosspoint 651 of the first inner loop of coil 601 at length L6 extending under L3. The second coil 602 similarly includes lengths that form squares of successively decreasing area. The second inner loop comprises a second crosspoint 652 extending under lengths of the inner and outer loops, which couples a terminal end of the second inner loop of coil 602 with an outer loop of a third coil 603.

Analogously, coil 603 includes a third outer and third inner loop. The third outer loop is coupled to the second crosspoint 652 of the second inner loop. The third inner loop comprises a third crosspoint 653 extending under the third inner loop of coil 603. Finally, coil 604 includes a fourth outer and fourth inner loop. The fourth outer loop is coupled to the third crosspoint 653. The fourth inner loop comprises a fourth crosspoint 654 coupling coil 604 to lengths L7 and L8, which form a portion of the first outer loop of coil 601. Accordingly, a second portion of the first outer loop (L7 and L8) is coupled to the fourth crosspoint 654. The second portion of the first outer loop comprises a second terminal 612 that is coupled to a second terminal of driver circuit 610. Accordingly, current may flow between the first terminal and the second terminal through a single conductor comprising the 2×2 array of coils.

Figures 7A, 7B:
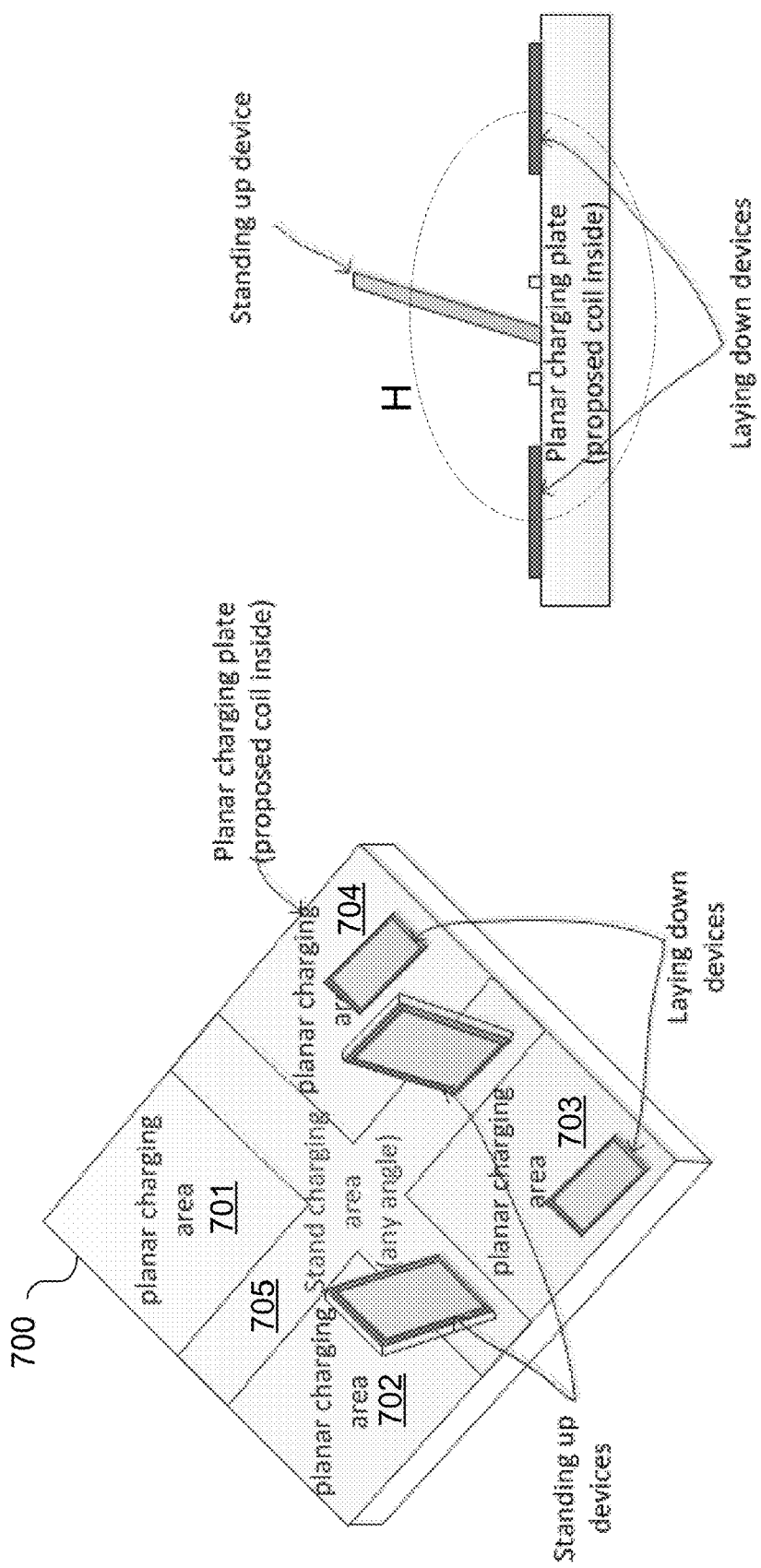
FIG. 7A illustrates a wireless charging platform.
FIG. 7B illustrates a side view of a wireless charging platform.

FIG. 7A illustrates a wireless charging platform 700 according to an embodiment. In this example, a charging platform includes four planar charging regions 701-704 where an electronic device that may be laid down horizontally and receive power from one of four coils in each region. An intermediate region 705 between the planar charging regions may be used for charging an electronic device when the device is standing up (e.g., while being used).

FIG. 7B illustrates a side view of a wireless charging platform according to an embodiment. A device is arranged in a standing up (vertical) position and receives magnetic field, H, which is about parallel to the plane of the charger. Because the H-field is horizontal in the intermediate region, the H-field may intersect the device at a near orthogonal angle for efficient charging. Laying down devices are also shown. For the laying down devices in regions 701-704 (FIG. 7A), the H-field also intersects the device at approximately an orthogonal angle for efficient charging.

FIGS. 8A-B illustrate example geometric shapes for coils according to different embodiments. Embodiments of the present disclosure may include arrays of coils in a variety of different symmetric geometric shapes, for example. Previous examples presented above illustrate coils in circular and square form. Other symmetric geometric shapes of coils may include hexagons, as shown in FIG. 8A, or octagons, as shown in FIG. 8B, for example. Other geometric shapes may be used based on the desired application and performance, for example.

FIGS. 9A-D illustrate example coil arrays according to different embodiments. FIG. 9A shows an alternative for the array arrangement where the coils are arranged in a diamond configuration with different distances between centerpoints of the geometric shapes (here, circular), for example. FIG. 9B illustrates that the arrays may be 2×2 arrays or arrays with different numbers of elements, such as where the number of coils is equal to a power of four (e.g., 4, 8, 16, etc . . . ).

Figure 10:
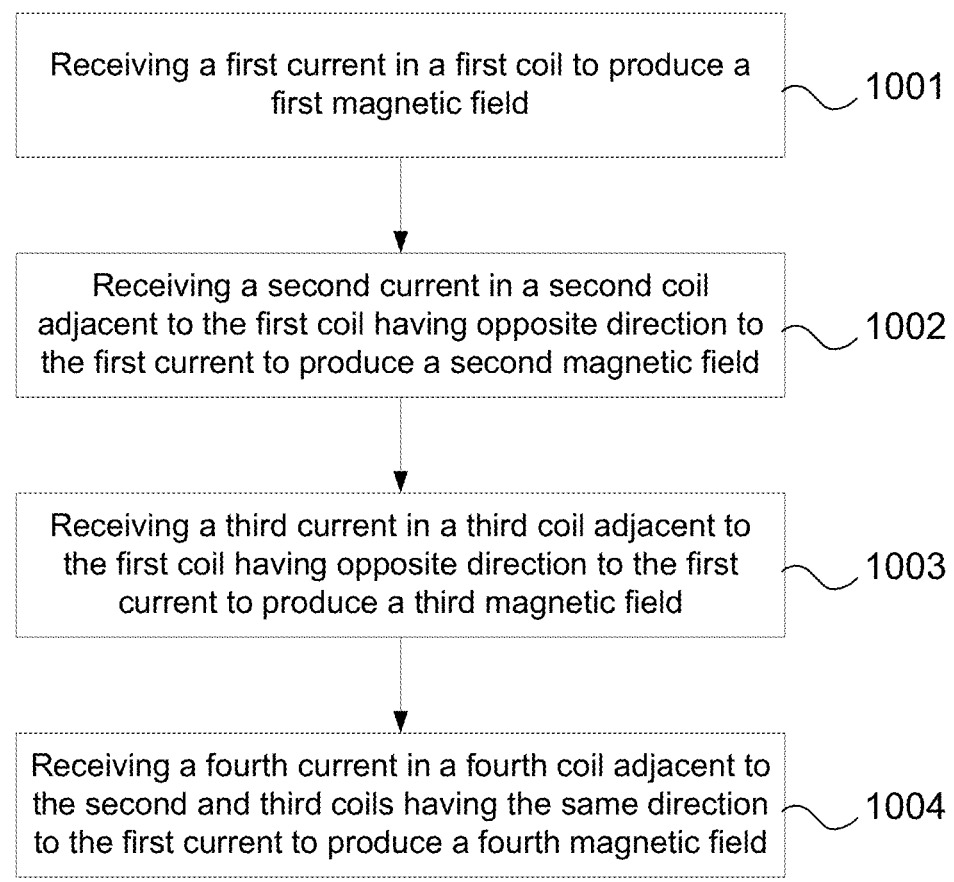
FIG. 10 illustrates a process according to an aspect of the disclosure.

FIG. 10 illustrates a process according to an embodiment. At 1001, a first current is received in a first conductive coil to produce a first magnetic field. At 1002, a second current is received in a second conductive coil adjacent to the first conductive coil, and having an opposite direction, to produce a second magnetic field. At 1003, a third current is received in a third conductive coil adjacent to the first conductive coil, and having an opposite direction, to produce a third magnetic field. At 1004, a fourth current is received in a fourth conductive coil adjacent to the second and third coils to produce a fourth magnetic field. The first conductive coil, the second conductive coil, the third conductive coil, and the fourth conductive coil are arranged in a two-by-two array as described above.

Figure 11A:
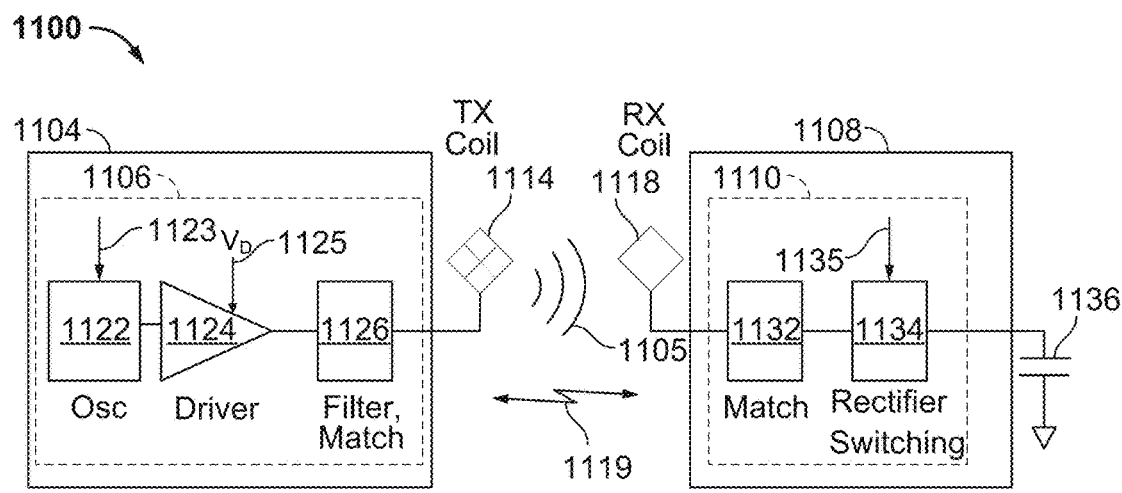
FIGS. 11A-B illustrate a wireless charging system according to an aspect of the disclosure.
Figure 11B:
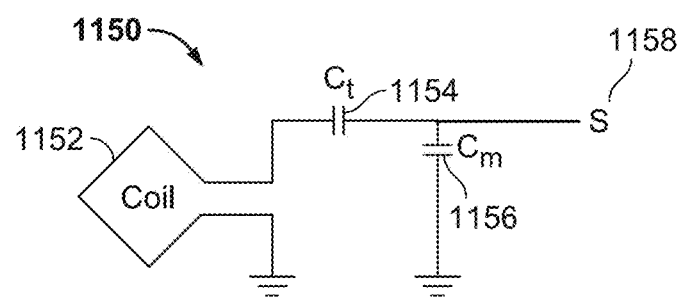

FIGS. 11A-B illustrate a wireless charging system 1100 including a transmitter 1104 and receiver 1108. In one example implementation, transmitter 1104 and receiver 1108 are configured according to a mutual resonant relationship. When the resonant frequency of receiver 1108 and the resonant frequency of transmitter 1104 are substantially the same or very close, transmission losses between the transmitter 1104 and the receiver 1108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 1108 may receive power when the receiver 1108 is located in an energy field 1105 produced by the transmitter 1104. The field 1105 corresponds to a region where energy output by the transmitter 1104 may be captured by a receiver 1105. In some cases, the field 1105 may correspond to the "near field" of the transmitter 1104 as will be further described below.

The near-field may correspond to a region in which there are strong reactive fields resulting from the currents and charges in the transmit antenna 1114 that minimally radiate power away from the transmit antenna 1114. Transmit antenna 1114 may comprise conductive coils arranged in a 2×2 array as described above. In some cases the near-field may correspond to a region that is within about one wavelength (or a fraction thereof) of the transmit antenna 1114. The transmit antenna 1114 and receive antenna 1118 are sized according to applications and devices to be associated therewith. As described above, efficient energy transfer may occur by coupling a large portion of the energy in a field 1105 of the transmit antenna 1114 to a receive antenna 1118 rather than propagating most of the energy in an electromagnetic wave to the far field The transmitter 1104 may include transmit circuitry 1106 that may include an oscillator 1122, a driver circuit 1124, and a filter and matching circuit 1126. The oscillator 1122 may be configured to generate a signal at a desired frequency, such as 468.75 KHz, 6.78 MHz or 13.56 MHz, that may be adjusted in response to a frequency control signal 1123. The oscillator signal may be provided to a driver circuit 1124 configured to drive the transmit antenna 1114 at, for example, a resonant frequency of the transmit antenna 1114. The driver circuit 1124 may be a switching amplifier configured to receive a square wave from the oscillator 1122 and output a sine wave. For example, the driver circuit 1124 may be a class E amplifier. A filter and matching circuit 1126 may be also be included to filter out harmonics or other unwanted frequencies and match the impedance of the transmitter 1104 to the transmit antenna 1114. As a result of driving the transmit antenna 1114, the transmitter 1104 may wirelessly output power at a level sufficient for charging or powering an electronic device. As one example, the power provided may be for example on the order of 300 milliWatts to 5 Watts or 5 Watts to 40 Watts to power or charge different devices with different power requirements. Higher or lower power levels may also be provided.

The receiver 1108 may include receive circuitry 1110 that may include a matching circuit 1132 and a rectifier and switching circuit 1134 to generate a DC power output from an AC power input to charge a battery 1136 as shown in FIG. 11A or to power a device (not shown) coupled to the receiver

1108. The matching circuit 1132 may be included to match the impedance of the receive circuitry 1110 to the receive antenna 1118. The receiver 1108 and transmitter 1104 may additionally communicate on a separate communication channel 1119 (e.g., Bluetooth, zigbee, cellular, etc). The receiver 1108 and transmitter 1104 may alternatively communicate via in-band signaling using characteristics of the wireless field 1105.

FIG. 11B is a schematic diagram of a portion of transmit circuitry 1106 or receive circuitry 1110 of FIG. 11A. Antenna 1152 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power as described above, for example. As used herein, an antenna 1152 is an example of a "power transfer component" of a type that is configured to wirelessly output and/or receive power. The antenna 1152 may be configured to include an air core or a physical core such as a ferrite core (not shown).

As stated, efficient transfer of energy between the transmitter 1104 and receiver 1108 may occur during matched or nearly matched resonance between the transmitter 1104 and the receiver 1108. However, even when resonance between the transmitter 1104 and receiver 1108 are not matched, energy may be transferred, although the efficiency may be affected. Transfer of energy occurs by coupling energy from the field 1105 of the transmit antenna 1114 coil to the receive antenna 1118 coil residing in the neighborhood where this field 1105 is established rather than propagating the energy from the transmit antenna 1114 into free space.

The resonant frequency of the loop or magnetic antennas is based on the inductance and capacitance. Inductance may be simply the inductance created by the antenna 1152, whereas, capacitance may be added to the antenna's inductance to create a resonant structure at a desired resonant frequency. As a non limiting example, capacitor 1154 and capacitor 1156 may be added to the transmit or receive circuitry 1150 to create a resonant circuit that selects a signal 1158 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near field may increase. Other resonant circuits formed using other components are also possible. As another non limiting example, a capacitor may be placed in parallel between the two terminals of the antenna 1150. For transmit antennas, a signal, S, 1158 with a frequency that substantially corresponds to the resonant frequency of the antenna 1152 may be an input to or received from an antenna 1152.

In one embodiment, the transmitter 1104 may be configured to output a time varying magnetic field with a frequency corresponding to the resonant frequency of the transmit antenna 1114. When the receiver is within the field 1105, the time varying magnetic field may induce a current in the receive antenna 1118. As described above, if the receive antenna 1118 is configured to be resonant at the frequency of the transmit antenna 1118, energy may be efficiently transferred. The AC signal induced in the receive antenna 1118 may be rectified as described above to produce a DC signal that may be provided to charge or to power a load.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the different aspects and example described herein.

The various illustrative blocks, modules, and circuits described in connection with the aspects and examples disclosed herein may be implemented or performed in connection with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A wireless charger comprising:
   at least four conductive coils arranged in a two-by-two array, each conductive coil in the two-by-two array arranged to have a first adjacent conductive coil and a second adjacent conductive coil, and when a particular conductive coil comprises a first current in a first direction around the particular conductive coil, a second current in the first adjacent conductive coil is in direction than the first direction around the first adjacent conductive coil and a third current in the second adjacent conductive coil is in the opposite direction than the first direction around the second adjacent conductive coil, wherein the at least four conductive coils are formed using a single conductor and include:
   a first outer loop and a first inner loop, a first portion of the first outer loop comprising a first terminal, the first inner loop comprising a first crosspoint;
   a second outer loop and a second inner loop non-adjacent to the first outer loop and the first inner loop, the second outer loop coupled to the first crosspoint of the first inner loop, the second inner loop comprising a second crosspoint;

a third outer loop and a third inner loop, the third outer loop coupled to the second crosspoint of the second inner loop, the third inner loop comprising a third crosspoint; and a fourth outer loop and a fourth inner loop, the fourth outer loop coupled to the third crosspoint, the fourth inner loop comprising a fourth crosspoint, wherein a second portion of the first outer loop is coupled to the fourth crosspoint and the second portion of the first outer loop comprises a second terminal, and wherein current flows between the first terminal and the second terminal.

2. The wireless charger of claim 1 wherein the at least four conductive coils are arranged on a wireless charging platform.

3. The wireless charger of claim 2 wherein regions between and above adjacent conductive coils comprise magnetic fields approximately parallel to a plane of the charging platform for simultaneous operation and charging of an electronic device when said electronic device is placed at a first angle to a plane of the wireless charging platform in one of the regions.

4. The wireless charger of claim 1 wherein the first current, the second current, and the third current are AC currents and the first current is 180 degrees out of phase with the second current and the third current.

5. The wireless charger of claim 1 wherein the first current and the second current flow in the same direction along a portion of the particular conductive coil that is adjacent to the first adjacent conductive coil and the first current and the third current flow in the same direction along a portion of the particular conductive coil that is adjacent to the second adjacent conductive coil.

6. The wireless charger of claim 1 wherein the at least four conductive coils each comprise a plurality of loops.

7. The wireless charger of claim 6 wherein at least a portion of the plurality of loops are in the same plane.

8. The wireless charger of claim 6 wherein the plurality of loops are in two or more parallel planes.

9. The wireless charger of claim 1 wherein the at least four conductive coils are formed on the same substrate.

10. The wireless charger of claim 1 wherein the at least four conductive coils are a number of coils equal to a power of four.

11. The wireless charger of claim 1 wherein the at least four conductive coils comprise a single winding.

12. The wireless charger of claim 1 wherein the at least four conductive coils comprise a plurality of windings.

13. The wireless charger of claim 1 wherein the at least four conductive coils comprise a symmetric geometric shape.

14. The wireless charger of claim 13 wherein the geometric shape is at least one of square, circular, hexagonal, or octagonal, or any combination thereof.

15. The wireless charger of claim 1 wherein the at least four conductive coils are arranged in the same plane.

16. A method comprising:
receiving a first current in a first conductive coil to produce a first magnetic field;
receiving a second current in a second conductive coil to produce a second magnetic field;
receiving a third current in a third conductive coil to produce a third magnetic field; and
receiving a fourth current in a fourth conductive coil to produce a fourth magnetic field;

wherein the first conductive coil, the second conductive coil, the third conductive coil, and the fourth conductive coil are formed using a single conductor including:
a first outer loop and a first inner loop, a first portion of the first outer loop comprising a first terminal, the first inner loop comprising a first crosspoint;
a second outer loop and a second inner loop non-adjacent to the first outer loop and the first inner loop, the second outer loop coupled to the first crosspoint of the first inner loop, the second inner loop comprising a second crosspoint;
a third outer loop and a third inner loop, the third outer loop coupled to the second crosspoint of the second inner loop, the third inner loop comprising a third crosspoint; and
a fourth outer loop and a fourth inner loop, the fourth outer loop coupled to the third crosspoint, the fourth inner loop comprising a fourth crosspoint, wherein a second portion of the first outer loop is coupled to the fourth crosspoint and the second portion of the first outer loop comprises a second terminal, and wherein current flows between the first terminal and the second terminal.

17. The method of claim 16 wherein the first, second, third, and fourth conductive coils are arranged on a wireless charging platform, and wherein regions between and above adjacent conductive coils comprise magnetic fields approximately parallel to a plane of the charging platform for simultaneous operation and charging of an electronic device when said electronic device is placed at a first angle to the plane of the wireless charging platform in one of the regions.

18. A wireless charger comprising:
first means for producing a first magnetic field based on a first current;
second means for producing a second magnetic field based on a second current;
third means for producing a third magnetic field based on a third current; and
fourth means for producing a fourth magnetic field based on a fourth current;
wherein the first means, the second means, the third means, and the fourth means are formed using a single conductor means including:
a first outer loop and a first inner loop, a first portion of the first outer loop comprising a first terminal, the first inner loop comprising a first crosspoint;
a second outer loop and a second inner loop non-adjacent to the first outer loop and the first inner loop, the second outer loop coupled to the first crosspoint of the first inner loop, the second inner loop comprising a second crosspoint;
a third outer loop and a third inner loop, the third outer loop coupled to the second crosspoint of the second inner loop, the third inner loop comprising a third crosspoint; and
a fourth outer loop and a fourth inner loop, the fourth outer loop coupled to the third crosspoint, the fourth inner loop comprising a fourth crosspoint, wherein a second portion of the first outer loop is coupled to the fourth crosspoint and the second portion of the first outer loop comprises a second terminal, and wherein current flows between the first terminal and the second terminal.

* * * * *